United States Patent [19]

Dislich et al.

[11] 3,847,583

[45] Nov. 12, 1974

[54] PROCESS FOR THE MANUFACTURE OF MULTI-COMPONENT SUBSTANCES

[75] Inventors: Helmut Dislich, Mainz-Gonsenheim; Paul Hinz, Mainz-Mombach; Reinhard Kaufmann, Mainz, all of Germany

[73] Assignee: Janaer Glaswerk Schott & Gen., Mainz, Germany

[22] Filed: May 2, 1973

[21] Appl. No.: 356,645

Related U.S. Application Data

[62] Division of Ser. No. 59,669, July 30, 1970, Pat. No. 3,759,683.

[30] Foreign Application Priority Data

Aug. 13, 1969 Germany.............................. 1941191

[52] U.S. Cl............................ 65/33, 65/43, 65/60, 65/134, 106/50, 117/129
[51] Int. Cl.............................. C03c 5/00, C03c 5/06
[58] Field of Search............ 65/43, 60, 33, 30, 134; 106/50, 39.5 –39.8; 117/129

[56] References Cited
UNITED STATES PATENTS

| | | | |
|---|---|---|---|
| 3,640,093 | 2/1972 | Levene et al. ........................ | 65/134 |
| 3,332,490 | 7/1967 | Burtch et al. ........................ | 65/33 X |
| 3,493,341 | 2/1970 | Le Page et al. ..................... | 65/33 X |
| 2,749,668 | 6/1956 | Chaffotte et al. ................... | 65/43 |
| 3,459,569 | 8/1969 | Ellis .................................... | 65/43 X |
| 3,617,794 | 11/1971 | Bakel et al. ......................... | 65/60 X |

*Primary Examiner*—S. Leon Bashore
*Assistant Examiner*—Kenneth M. Schor
*Attorney, Agent, or Firm*—Burgess, Dinklage & Sprung

[57] ABSTRACT

Glassy, crystalline, or glassy crystalline oxidic multi-component substances, which are produced without going through a molten phase. An alkali or alkaline earth metal compound and at least one other metal compound, both dissolved in an organic solvent, are reacted in the solvent, the solvent is evaporated to form a precipitate, and the precipitate is heated to form the multi-component substance. The compositions are applied as coatings to substrates, e.g., glasses. Application can be by dipping the substrates in the solutions.

24 Claims, No Drawings

PROCESS FOR THE MANUFACTURE OF MULTI-COMPONENT SUBSTANCES

This application is a division of application Ser. No. 59,669, filed July 30, 1970, now U.S. Pat. No. 3,759,683.

BACKGROUND

The invention relates to a process for the manufacture of glassy, crystalline or glassy-crystalline multi-component systems without recourse to melting.

Among the transparent multi-component substances known, glasses are the most important. Multi-component glasses are manufactured according to prior art methods by melting, i.e., at temperatures far above the transformation range, at viscosities usually ranging from about $10^2$ to about $10^3$ poises. Not until this range of temperatures and viscosities is reached can the individual components of the mixture (usually oxides) react with one another in the manner necessary for the formation of glass. Sometimes the temperatures required for the attainment of the above-stated viscosity range are so high that they threaten to make the melting process impractical.

Transparent coatings made by known methods may consist of individual oxides or mixed oxides. Such processes start with hydrolyzable compound which is deposited out of a solvent onto the support where it is hydrolyzed and transformed to an oxide layer by raising the temperature. In this manner, $SiO_2$ and $TiO_2$ coatings are prepared without passing through the molten phase. In the preparation of mixed-oxide coatings, the process is limited to those elements which individually form oxides that are resistant to their surroundings — i.e., to air, as a rule, with its ordinary moisture content. No method has become known for introducing, say, alkali oxides or alkaline earth oxides into such layers or coatings.

Nevertheless, the introduction of alkali oxides and alkaline earth oxides, which are known to be glass transforming agents, would signify an important technical advantage, since it would diminish the tendency of such layers to devitrify, which is often triggered by components of the support, and it would also lead to a denser composition in such layers, also due to the fact that heating can then be carried up to the transformation range so that the layers can arrange themselves and densify. The individual oxide and mixed oxide layers, however, have their transformation ranges at such high temperatures that as a rule they cannot be heated up to this range because their supporting materials cannot withstand these temperatures.

The preparation of homogeneous mixtures, for example as starting materials for hydrothermal syntheses, is in the prior art. In this procedure hydroxides are precipitated together at certain pH values, but this yields nothing but mixed hydroxides from which definite glasses (glasses of definite composition) cannot be obtained without passing through the molten phase, or else nitrates are calcined all together and the same thing can be said. According to the prior art, nitrates of other metals are added to alcoholic solutions of silicic acid ethyl ester and the solutions are hydrolyzed with water, whereupon $SiO_2$ precipitrates as a gel. Calcining follows, in order to decompose the nitrates. This method, too, produces nothing but mixtures. The use of other organometallic compounds is described, such as aluminum isopropylate, triethanolamine titanate, and tetrabutyl titanate. The only advantage of these compounds is stated to be that the heating does not need to be as high as it does with the nitrates. Alkali alcoholates and alkaline earth alcoholates are not mentioned. Alkali is added in the form of carbonate or hydroxide before the hydrolysis, and the cations are simply absorbed into the gel, thus preventing separate crystallization. In the processes known hitherto, therefore, mixtures are always produced from which no definite glassy, crystalline or glassy-crystalline oxidic multi-component solids are obtained without passing through the molten phase. In particular, it is not possible by these methods to apply, for example, glassy coatings to substrates.

THE INVENTION

The invention concerns a general process for the preparation of glassy, crystalline or glassy-crystalline, oxidic multi-component substances, which are or may be transparent, without passing through a molten phase, characterized in that alkali compounds and/or alkaline earth metal compounds that are soluble as solutes in organic solvents are dissolved in organic solvents; other metal compounds of groups I B, II B, III, IV, V, VI, VII A or VIII of the periodic system (Mendelyeev) which are soluble as solutes in organic solvents are dissolved in organic solvents; the alkali or alkali earth metal compounds are reacted with the metal compounds of said Groups I B to VIII in organic solution, so that a homogeneous solution containing the reaction product is formed; then solvent is evaporated in the presence of moisture leaving a residue and finally heating the residue to temperatures below the melting point or melting range of the reaction product.

The alkali compounds or alkali earth metal compounds are preferably used as alcoholates or in a form such that they form alcoholates in solution or form alcoholate complexes with one another in solution. Of the said other metal compounds, $P_2O_5$, $As_2O_3$ and $H_3BO_3$ are examples of preferred materials; other preferred compounds are disclosed in the examples, infra. Alkali and alkali earth metal compounds which can be used, as preferred embodiments, are lithium, sodium, potassium, and calcium and barium; other of said other metal compounds, being preferred embodiments, are magnesium, boron, titanium, silicon, phosphorous, aluminum, zirconium, lead, and zinc. As used herein, "alkali earth metal group" includes magnesium, calcium, strontium and barium.

By the process according to the invention, transparent multi-component substances are obtained even at temperatures that are far below the melting temperature of the substance in question. This is due to the fact that, on account of their reactivity, the components form compounds with one another while in the solvent and during the heating that follows. An example of this is the following reaction:

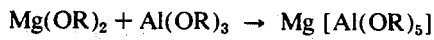

wherein the soluble magnesium aluminum alcoholate complex compound forms from magnesium alcoholate and aluminum alcoholate in an alcoholic solution (Houben-Weyl "Methoden der organischen Chemie," Vol. VI/2, Part 2, Page 31, Georg Thieme Verlag Stuttgart, 1963). This complex compound is further processed according to the invention (Example 8) to form spinel. Molecular residues are hydrolytically and/or pyrolytically split off from these compounds with the formation of the transparent multi-component substances, thereby eliminating the necessity of high temperatures. The transparent multi-component substances may be of a glassy, crystalline or glassy-crystalline nature.

In the case of the formation of multi-component glasses, the temperatures that are needed are temperatures in the transformation range of the glasses or lower, and hence they are far below the usual melting temperature. In the case of the preparation of a borosilicate glass, this temperature amounts, for example, to 560°C. The invention therefore contains a new and general principle for the making of glasses without melting.

If a multi-component glass is to be produced, the mixing ratio of the individual components is so selected that the mixture ratio of the resulting oxides is in the known glassy region of the multi-component system in question. If a crystalline phase is to result, the mixing ratio of the individual components is chosen accordingly. If a partly glassy, partly crystalline system is to result, such as a ceramic glass for example, the mixing ratio is made to correspond to a ceramic glass and the mixture preferably contains nucleating agents, so that at first an exclusively glassy system develops, which by an appropriate temperature program is brought to partial crystallization.

It is possible that, just as it happens in the melting of a glass, a partial volatilization of one of the components may produce a shift in the mixture ratio, and allowance is made for this in preparing the mixture.

The process of the invention is especially suited for making coatings on substrates. The process can be performed in the following manner: Inter-reacting individual compounds of the desired multi-component substances are put successively into a solvent and dissolved. Alcohols, particularly lower aliphatic alcohols such as $C_1$–$C_4$ alkanols, are preferred as solvents, although other organic solvents, such as ketones, esters and mixtures of ketones and esters, and mixtures of same with water, can be used. The individual components are introduced preferably, though by no means exclusively, in the form of alcoholates. If desired, $H_3BO_3$, phosphorus pentoxide or arsenic pentoxide can be used. In addition to the alcoholates of elements from higher groups of the periodic system, such as those of silicon, titanium, zirconium, aluminum or lead, those of the first two main groups are to be emphasized, such as the alcoholates of lithium, sodium, potassium, magnesium, calcium and barium. In the case of the production of glasses, the process of the invention thus permits the introduction of virtually any glass formers, and particularly of glass transforming agents. Since even while these starting solutions are being made ready a reaction takes place between the individual components, to produce soluble complex compounds for example, the order in which they are added is important. By a few preliminary experiments it is possible to determine what the sequence should be to prevent premature precipitations. In many cases, stabilizers, e.g., chelating agents, such as acetylacetone or triethanolamine, are added.

The bodies to be coated are dipped in the solution and withdrawn at a uniform rate. The solution can be slowly evaporated in the presence of moisture to leave as a residue a thick body, e.g., a gel. Then it is gradually heated to temperatures that are far below the melting temperature of the transparent multi-component substance—preferably to temperatures in the transformation range in the case of glasses. The reactions that take place are primarily of a hydrolytic nature, and possibly also of a pyrolytic nature in part. Water can be added to the solution, and in particular it can be taken from the moisture in the ambient air. In this manner, reaction products such as alcohols and hydrogen chloride can be cleaved from the complex compounds that are formed. The multi-component substances solidify by polycondensation reactions, also with the yielding of water, and they become increasingly insoluble until, at elevated temperature, all of the "helper radicals" that were the cause of the high reactivity have been split off and all that is left is the transparent multi-component substance. In the case of glasses we are confronted by the hitherto unknown circumstances that, owing to a cross-linking reaction of multi-functional compounds by the methods of organic chemistry, insoluble polycondensates are first produced which, after removal of the last "helper radicals," become a thermoplastic substance, namely glass.

The advantages of the process of the invention are:

1. The process permits the making of glasses of the prior art at lower temperatures than ever before possible.

2. The process permits the application of glass coatings of virtually any desired composition.

3. These glasses can be used to coat even those substrates, such as other glasses or metals, whose softening temperatures are lower than the melting temperatures of the glasses applied to them.

4. The invention permits the utilization of the chemical, optical, electrical and mechanical properties known in the same glasses prepared by melting, in thin coatings. For example, sensitive glasses can be provided with chemically resistant protective coatings. This is of special value in glasses whose optical properties have been highly cultivated at the expense of their chemical stability, i.e., weathering resistance.

5. The process avoids, on the basis of the low temperature, all of the disadvantages which the common melting process suffers on account of the high temperature, such as the expense involved in producing this high temperature, the attacking of the tanks and crucibles, and the danger of devitrification at high temperature, to name but a few.

6. The process is very general in regard to variability in the composition of the transparent multi-component substances being prepared, because easily variable parameters are available in the solvent, in the nature of the substitution of the elements to be put in and hence in their reactivity, solubility and hydrolyzability and pyrolyzability, whereby the process can be controlled without their having an effect on the end product.

7. The transformation range can be varied within wide limits by changing the nature and quantity of the individual components. For example, coatings having relatively low transformation temperatures can be deliberately produced, which is not the case, as a rule, with individual oxides or mixed oxides. Such coatings can arrange themselves and densify when they are heated in the transformation range.

8. Optical, chemical, mechanical or electrical characteristics of the glasses can be tailored to requirements within wide limits without great expense.

9. Coatings according to the invention can be applied to metals which can thus be insulated electrically.

10. Coatings according to the invention prevent or inhibit the scaling of metals, such as iron and brass, at elevated temperature, and they prevent the corrosion of brass.

11. Coatings according to the invention, having a composition corresponding to a common glass ceramic, can be transformed, like the corresponding melted glass ceramic, to the glassy-crystalline state by a heat treatment.

12. Coatings according to the invention can be applied to substrates whose softening point is higher than that of the coatings, and then the coating can be fused onto the substrate.

EXAMPLE 1 — Borosilicate Glass

Preparation of the Solution

The following were put successively into a three-necked flask provided with stirrer and reflux condenser, with stirring and flooding with nitrogen:

50 g ethanol (dry) + 0.5 g acetyl acetone
102 g $Si(OCH_3)_4$
5.3 g $Al(O \text{ sec. } C_4H_9)_3$
10.5 g $NaOCH_3$ (sol. in methanol corr. to 172 g $Na_2O$ per liter)
1.4 g $KOC_2H_5$ (sol. in ethanol corr. to 218 g $K_2O$ per liter)

The precipitate that forms when the aluminum secondary butylate is added is dissolved by stirring with heating at 70°C. Thereafter, 11.2 g of $H_3BO_3$, dissolved in 120 ml of boiling ethanol, is added. The precipitate that forms dissolves in 5 minutes. The solution has a dark yellow color and contains the compounds in the following ratio, calculated as oxides:

| | |
|---|---|
| 1.27% | $B_2O_3$ |
| 80.6% | $SiO_2$ |
| 3.6% | $Na_2O$ |
| 2.2% | $Al_2O_3$ |
| 0.6% | $K_2O$ |

The total oxide content of the solution amounts to about 160 g per liter. With the exclusion of atmospheric moisture the solution is stable.

Preparation of Thin Coatings

The solution is diluted with ethanol and acetyl acetone to 30 g total oxide per liter and 20 g acetyl acetone per liter. A cover glass is immersed in it and withdrawn in ambient air at a rate of 5 cm per minute (at 22°C. and 6 g moisture per m³), whereupon hydrolysis and some evaporation occurs, leaving a residue, and then the residue is heated at about 40°C/min. to 560°C. and is held at 560°C. for about 15–30 minutes. At the concentration of 30 g total oxide per liter the thickness of the single coat is of the order of magnitude of 100 to about 600A. To obtain thicker coatings, the boron trioxide concentration can be increased to 18percent, for example, thus making possible the application of transparent coatings at a concentration of 80 g total oxide per liter. Coatings made in this manner have thicknesses of the order of 1,000 to about 5,000 A. The thickness can be further increased by repeated coating and by increasing the viscosity of the solution, which is achieved by hydrolization.

Properties of the Coatings

The coating is clear and transparent and steel scriber-proof. The infrared spectrum gives the typical curve of a borosilicate glass.

Metals can be electrically insulated with thicker coatings (repeated coating). These coatings prevent or inhibit at the same time the scaling of metals, of iron for example. An iron plate thus coated does not scale when it is heated for 3 hours at 800°C. An uncoated iron plate is completely covered with scale under such severe conditions. The tarnishing of brass is also prevented. An untreated brass plate rapidly tarnishes at 530°C., while a coated one retains its bright surface.

EXAMPLE 2 — Phosphate-Silicate Glass

Preparation of the Solution

The following were placed in the order given, in a three-necked flask provided with stirrer and reflux condenser, with stirring and with flooding with nitrogen.

| | |
|---|---|
| 55 g | ethanol |
| 4.5 g | acetyle acetone |
| 13.4 g | $Si(OCH_3)_4$ |
| 10.7 g | $Al(O \text{ sec. } C_4H_9)_3$ |

The mixture is then refluxed for 5 minutes, whereupon the following are added:

| | | |
|---|---|---|
| 1.4 ml | | $Ba(OC_2H_5)_2$ solution (Sol. in $C_2H_5OH$ corr. to 146 g BaO/l) |
| 1 ml | | $Ca(OC_2H_5)_2$ solution (Sol. in $C_2H_5OH$ corr. to 70.7 g CaO/l) |
| 1 ml | | $Mg(OCH_3)_2$ solution (Sol. in $CH_3OH$ corr. to 16.3 g MgO/l) |
| 0.4 g | | $H_3BO_3$ (dissolved in 15 ml of hot $C_2H_5OH$) |
| 0.8 g | | $P_2O_5$ ) |
| | | ) – Dissolved together in 15 ml $C_2H_5OH$ |
| 0.01 g | | $As_2O_3$ ) |

The solution is clear, yellow colored, and contains about 80 g total oxide per liter, the concentration of the oxides being as follows:

| | |
|---|---|
| $SiO_2$ | 60.0% |
| $Al_2O_3$ | 25.2% |
| MgO | 0.02% |
| $P_2O_5$ | 9.0% |
| $B_2O_3$ | 2.6% |
| CaO | 0.78% |
| BaO | 2.3% |
| $As_2O_3$ | 0.10% |

As long as atomspheric moisture is excluded the solution is stable.

Preparation of Thin Coatings

The solution is diluted with ethanol to 50 g total oxide per liter. A lip of cover glass is partially immersed and withdrawn into ambient (moist) air at a rate of 27 cm/min and then heated for 15 minutes at 520°C.

Properties of the Coating

The coating is glass-clear and steel scriber-proof. In a similar coating on a platinum plate, the following elements were detected qualitatively by means of the microprobe: Si, Al, Mg. P, Ca, Ba, C (B is not detectable by this method). No crystalline phases were found.

In the case of a single coat, the thickness amounts to about 250 $\mu$. A cover glass half coated was weathered in a weathering chamber; the bare portion of the cover glass was clearly attacked after 144 hours, but not the coated half.

Schott glasses LaK 21, LaK N7 and PSK 51 and an extremely sensitive borate glass were likewise half-coated. LaK 21 and LaK N7 were stabilized against attack by water at 55°C for 72 hours and against weathering in a weathering chamber. Coated PSK 51 was tested in the weathering chamber and not until after 100 hours did it show deterioration of the coating, while uncoated PSK 51 lost its transparency completely in 30 hours. Similarly applied coatings of $SiO_2$ did not result in any such protective effect on any of these three glasses. The sensitive borate glass was very rapidly attacked in water at 55°C, but when coated it showed no sign of attack after 3 hours of exposure.

EXAMPLE 3— Lead Silicate Glass

Preparation of the Solution

The following were placed successively into a three-necked flask provided with stirrer and reflux condenser, with stirring and flooding with nitrogen:
- 10 g ethanol
- 15.7 g $Si(OCH_3)_4$
- 4.7 g $NaOCH_3$ (sol. in $CH_3OH$ corr. to 172 g of $Na_2O$ per liter)
- 47.2 g $Pb(OC_4H_9)_2$ (sol. in $C_4H_9OH$ corr. to 68 g $PbO_2$ per liter)

The solution has a light yellow color and contains the compounds in the following concentration, calculated as oxides:

| | |
|---|---|
| 62% | $SiO_2$ |
| 30% | $PbO$ |
| 8% | $Na_2O$ | and the total oxide content of the solution amounts to about 120 grams per liter.

Preparation of Thin Coatings

The solution is diluted with ethanol to 10 g total oxide per liter and stabilized with 2 percent triethanolamine. A piece of cover glass is immersed in it and withdrawn into the ambient (moist) air at a rate of 5 cm per minute, and then treated for 15 minutes at 450°C.

Properties of the Coating

The coating is transparent and shiny. It is steel scriber-proof. Si, Pb and Na were detected qualitatively by means of the microprobe in a coating applied to a slip of platinum.

EXAMPLE 4 — Coatings Containing Eucryptite

Preparation of the Solution

The following were placed successively into a three-necked flask provided with stirrer and reflux condenser, with stirring and flooding with nitrogen:
- 400 ml ethanol
- 2.5 ml acetyle acetone
- 54 g $AL(OC_4H_9)_3$
- 36 g $LiOC_2H_5$ (sol. in $C_2H_5OH$ corr. to 92 grams $Li_2O$ per liter)
- 34 g $Si(OCH_3)_4$ The clear solution obtained has a light brown color and is stable. It contains the oxides in the following molar ratio:

1 $Li_2O$ . 1 $Al_2O_3$ . 2 $SiO_2$ for a total oxide content of 53 g/l.

Preparation of Coatings

A slip of cover glass was withdrawn from a solution containing approximately 53 g total oxide per liter, at a rate of 27 cm/min, into the ambient (moist) atmosphere, and the coating was fired at 600°C. for 15 minutes.

Properties of the Coating

The coating is transparent, brass scriber-proof and almost steel scriber-proof.

EXAMPLE 5— Glass Ceramic

Preparation of the Solution

The following were placed successively in a three-necked flask provided with stirrer and reflux condenser, with stirring and flooding with nitrogen:
- 100 ml — ethanol (dry)
- 2.8 g — acetyl acetone
- 10.4 g — Al (0 sec $C_4H_9$)$_3$.

The mixture was refluxed for 5 minutes and then the following was added:
- 15.6 g $Si(OCH_3)_4$
- 0.3 ml $NaOCH_3$ solution (sol. in $CH_3OH$, corresponding to 172 g of $Na_2O$ per liter)
- 0.6 ml Zr $(OC_3H_7)_4$ solution (sol. in $C_3H_7OH$, corresponding to 290 g of $ZrO_2$ per liter)
- 1.1 g $Ti(OC_4H_9)_4$
- 0.7 g $P_2O_5$ (dissolved in 10 ml ethanol)
- 6.6 ml $LiOC_2H_5$ solution (sol. in $C_2H_5OH$, corresponding to 57.8 g $Li_2O$ per liter)
- 8.6 ml $Mg(OCH_3)_2$ solution (sol. in $CH_3OH$, corresponding to 16.3 g $MgO$ per liter).

The solution has a pale yellow color and has a limited stability; it contains the oxides in the following concentration:

| | |
|---|---|
| $SiO_2$ | 61.4% |
| $Al_2O_3$ | 21.6% |
| $P_2O_5$ | 6.8% |
| $Li_2O$ | 3.8% |
| $MgO$ | 1.4% |
| $Na_2O$ | 0.5% |
| $TiO_2$ | 2.6% |
| $ZrO_2$ | 1.9% |

The total oxide content of the solution is 77 g/l.

Preparation of Coatings

Coatings were applied to a Supremax glass from a solution containing 77 g total oxide per liter, at a withdrawal rate of 27 cm per minute into the ambient (moist) atmosphere and were fired on at 580°C. for 30 minutes. The coatings are hard, transparent and shiny.

EXAMPLE 6 — Glass Ceramic

Preparation of the Solution

The following were placed successively in a three-necked flask provided with stirrer and reflux condenser, with stirring and flooding with nitrogen:
- a. 100 ml ethanol (dry)
- 15.7 g $Si(OCH_3)_4$
- 2.8 g acetyl acetone
- 10.5 g $Al(OC_4H_9)_3$.

This solution was then refluxed for 5 minutes, and then the following were added:
- 4.9 ml $LiOC_2H_5$ solution (sol. in $C_2H_5OH$, corresp. to 57.8 g $Li_2O$/l)
- 0.2 ml $KOC_2H_5$ solution (sol. in $C_2H_5OH$, corresp. to 221 g $K_2O$/l)
- 0.7 ml $Ca(OC_2H_5)_2$ solution (sol. in $C_2H_5OH$, corr. to 49.2 g $CaO$/l)
- 1.1 ml $BA(OC_2H_5)_2$ solution (sol. in $C_2H_5OH$, corr. to 142.5 g $BaO$/l).

31.8 ml zinc acetyl acetonate solution (sol. in $C_2H_5OH$, with the addition of 2 percent acetyl acetone, corr. to 19.2 g ZnO/l)
0.8 g $Ti(OC_4H_9)_4$
0.6 ml Zr $(O—i—C_3H_7)_4$ solution (sol. in isopropanol, corr. to 290 grams $ZrO_2$ per liter)
3.8 ml $Mg(OCH_3)_2$ solution (sol. in $CH_3OH$, corr. to 29.4 g MgO/l).

The solution has a pale yellow color and limited stability. It contains the oxides in the following concentrations:

| | |
|---|---|
| $SiO_2$ | 62.00% |
| $Al_2O_3$ | 21.85% |
| ZnO | 6.16% |
| $Li_2O$ | 2.28% |
| $TiO_2$ | 1.77% |
| $ZrO_2$ | 1.77% |
| BaO | 1.61% |
| MgO | 1.11% |
| CaO | 0.50% |
| $K_2O$ | 0.40% |

The total oxide content of the solution is 57.9 g/l.
b. Precisely the same solution was prepared, with the omission of the nucleating agents $TiO_2$ and $ZrO_2$.

Preparation of Coatings

Thin, transparent coatings were obtained by drawing out of dilute solutions (10 g total oxide per liter in the case of Solution (a), and 40 g total oxide per liter in the case of Solution (b), into the ambient (moist) air, followed by heating at 630°C. for 15 minutes.

EXAMPLE 7 — Silicate Glass with High Alkali Content

Preparation of the Solution

The following were placed successively in a three-necked flask provided with stirrer and reflux condenser, with stirring and flooding with nitrogen:

| | |
|---|---|
| 300.0 g | ethanol (dry) |
| 28.9 g | $Al(OC_4H_9)_3$ |
| 2.0 g | acetyl acetone |

The mixture was then refluxed until it was clear, and then the following were added:
121.5 g $Si(OCH_3)_4$ in 120 ml ethanol
31.5 ml $NaOCH_3$ solution (solution in $CH_3OH$, corresponding to 172 g $Na_2O$ per liter).
The solution is reddish brown and stable; it contains the oxides in the following concentration:

| | |
|---|---|
| $SiO_2$ | 80% |
| $Na_2O$ | 10% |
| $Al_2O_3$ | 10% |

The total oxide content of the solution was 80 g/l.

Coatings were applied to glass supports which were drawn from a solution of 10 g total oxide per liter, at a rate of 5 cm/min into the ambient air, and these became glassy clear after heating at 500°C. for about 15 minutes.

EXAMPLE 8 — Magnesium Aluminum Spinel

Preparation of the Solution

The following are successively placed in a two-necked flask provided with a stirrer:
250 ml of i-propanol
147 g of Al (O sec. $C_4H_9)_3$
30 ml of acetyl acetone The mixture is stirred until the Al(O sec. $C_4H_9)_3$ has clearly gone into solution. Then the following is added:

300 ml of ethanol.(99.9percent pure)
345 Ml $Mg(OCH_3)_2$ solution (sol. in methanol, corresponding to 35.2 g of MgO/l)

The clear solution obtained has a pale yellow color. It contains the oxides in the following molar ratio: 1 MgO . 1 $Al_2O_3$, at a total oxide content of 38 g/l.

Preparation of Thin Coatings

The solution is diluted to 30 g total oxide per liter with ethanol. A cover glass slip is immersed and withdrawn at a uniform rate of 5 cm/min into the ambient (moist) air. Then the coating is baked at 500°C. for 30 minutes.

Properties of the Coating

The coating is transparent and steel scriber-proof.
It is impossible by known methods to make spinels from $Mg(NO_3)_2$. $6H_2O$ and $NH_4Al(SO_4)_2$. 12 $H_2O$ at temperatures below 850°C.

Example for Comparison
45.3 g NH $Al(SO_4)_2$ . 12 $H_2O$
25.6 g $Mg(NO_3)_2$.6 $H_2O$ were melted in a procelain dish in their own water of crystallization and stirred to form a homogeneous liquid. During the heating, first the water of crystallization escapes, and later nitrous gases and $SO_3$ are yielded. After 2 hours of heat treatment at 620°C., no spinel can be detected by X-rays in the white powder. Not until after heating at 850°C for 24 hrs. do the mixed oxides turn partially into spinel.

What is claimed is:

1. Process for the production of a glassy, or crystalline multi-component oxide coating on a substrate which comprises: p1 a. dissolving in an organic solvent as a first component at least one of alkali metal compounds and alkali earth metal compounds and as a second component at least one of metal compounds of Groups IB, IIB, III, IV, V, VI, VII A or VIII of the periodic system, maintaining the solution at a temperature and for a time for reaction of said first component with said second component, and formation of a solution containing the reaction product, the proportion of the metal compounds in said organic solution corresponding to the composition of said multi-component oxide coating, b. coating the substrate with said solution, evaporating solvent from the solvent coating in the presence of moisture, to obtain said reaction product in solid, hydrolyzed form, and c. heating said reaction product in solid, hydrolyzed form to a temperature below the melting point or melting range of said multi-component oxide to form said multi-component oxide coating.

2. Process according to claim 1, wherein said oxide coating is a glass, the ratio of the reactive metal compounds being so selected that the ratio of the resulting oxides is in the glass-forming range of the oxidic multi-component oxide coating.

3. Process according to claim 1, wherein said ratio of the reactive metal compounds corresponding to a glass-ceramic and the solvent coating containing nucleating agent so that a glass coating forms which by an appropriate temperature program can be partially crystallized to form the glass ceramic.

4. Process according to claim 1, wherein said oxide coating is crystalline, the ratio of the reactive metal compounds being so selected that a crystalline layer is formed.

5. Process according to claim 1, said heating being at a temperature no higher than the temperature of the transformation range.

6. Process according to claim 1 wherein said second component includes $H_3BO_3$, $P_2O_5$, $As_2O_5$ or a mixture thereof.

7. Process according to claim 1 and including in the organic solvent a stabilizer.

8. Process according to claim 7, wherein the stabilizer is acetyl acetone or triethanolamine.

9. Process according to claim 1, said second component metal compound being alkoxide or ester.

10. Process according to claim 1, wherein said substrate is a glass having a softening point higher then the temperature of said heating.

11. Process according to claim 1, wherein said substrate is a metal having a melting point higher than the temperature of said heating.

12. Process according to claim 4, wherein said multi-component coating is magnesium aluminum spinel.

13. Process according to claim 3, and heating the glass coating to transform it into a glass ceramic.

14. Process according to claim 1, the first component being alkoxide.

15. Process according to claim 5, the second component being alkoxide or ester.

16. Process according to claim 1, said first component being alkoxide, and said second component being alkoxide or ester.

17. Process according to claim 1, said first component being at least one of alkoxides of lithium, sodium and potassium, said second component being at least one of compounds of magnesium, boron, titanium, silicon, phosphorus, aluminum, zirconium, lead, zinc, and arsenic.

18. Process according to claim 17, said second component being alkoxide or ester.

19. Process according to claim 16, said second component being alkoxide.

20. Process according to claim 1, said first component being at least one of alkoxides of lithium, sodium and potassium, said second component being at least one of $P_2O_5$, $As_2O_3$ and $H_3BO_4$.

21. Process according to claim 1, the organic solvent being an alcohol, ketone or ester.

22. Process according to claim 1, the organic solvent being an alcohol.

23. Process according to claim 1, wherein coating with said solvent is effected by immersing the substrate in the solution containing the reaction product, withdrawing the wetted substrate in ambient air, and allowing solvent to evaporate from the withdrawn substrate.

24. Process of making a glass, or crystalline oxidic multi-component oxide coating on a substrate which comprises:

a. dissolving in an organic solvent as a first component at least one of alkali metal alkoxides and alkali earth metal alkoxides, and as a second component at least one of metal compounds of Groups IB, IIB, III, IV, V, VI, VII A or VIII of the periodic system, maintaining the solution at a temperature and for a time for reaction of said first component with said second component, and formation of a solution containing the reaction product, the proportion of the metal compounds in said organic solution corresponding to the composition of the glass, b. coating the substrate with said solution, evaporating solvent from the solvent coating in the presence of moisture, to obtain said reaction product in hydrolyzed, gel form, and c. heating said reaction product in hydrolyzed, gel form at a temperature in or below the transformation range for a time sufficient to convert said reaction product to said glass or crystalline multi-component oxide coating substance, d. the proportion of the invidivual components dissolved in the organic solvent being such that the composition of the glass produced is in the glassy or crystalline region of the, respective, multi-component oxide glass or crystalline coating.

* * * * *